United States Patent [19]
Plotnick et al.

[11] 3,805,519
[45] Apr. 23, 1974

[54] FUEL CONTROL SYSTEM FOR A MULTI-FUEL GAS TURBINE

[75] Inventors: Richard J. Plotnick, Maple Shade, N.J.; Edward W. Tobery, Norristown; James E. Moir, Springfield, both of Pa.

[73] Assignee: Westinghouse Electric Corporation, Pittsburgh, Pa.

[22] Filed: May 5, 1972

[21] Appl. No.: 250,707

[52] U.S. Cl. .............................. 60/223, 60/39.28 R
[51] Int. Cl. ............................................... F02k 3/00
[58] Field of Search ........ 60/39.28 R, 39.09 R, 223; 137/116; 415/17

[56] References Cited
UNITED STATES PATENTS

| | | | |
|---|---|---|---|
| 3,626,693 | 12/1971 | Guillot | 60/39.28 R |
| 2,719,035 | 9/1955 | Morris | 60/39.09 R |
| 2,894,521 | 7/1959 | Carleton | 415/17 |
| 3,107,693 | 10/1963 | Puster | 137/116 |
| 3,168,810 | 2/1965 | Gatzemeyer | 60/39.28 T |
| 3,439,693 | 4/1969 | Wagner | 60/39.28 R |

Primary Examiner—Clarence R. Gordon
Attorney, Agent, or Firm—Fred J. Baehr, Jr.

[57] ABSTRACT

A pneumatically operated ON-OFF valve in each fuel conduit is operated by controlling the flow of pneumatic fluid supplied to the ON-OFF valves by operating an associated solenoid valve, which either supplies pneumatic fluid to each ON-OFF valve or vents the ON-OFF valve to atmosphere, and a hydraulically operated valve, which is operated in response to a reduction of oil pressure due to an overspeed trip signal from the turbine to shut off the supply of pneumatic fluid to the ON-OFF valves, closing the ON-OFF valve in each fuel conduit and shutting off all fuel to the turbine, thus, utilizing a single ON-OFF valve in each fuel conduit to select the fuel to be burned and to shut off all fuel when the turbine overspeeds.

3 Claims, 1 Drawing Figure

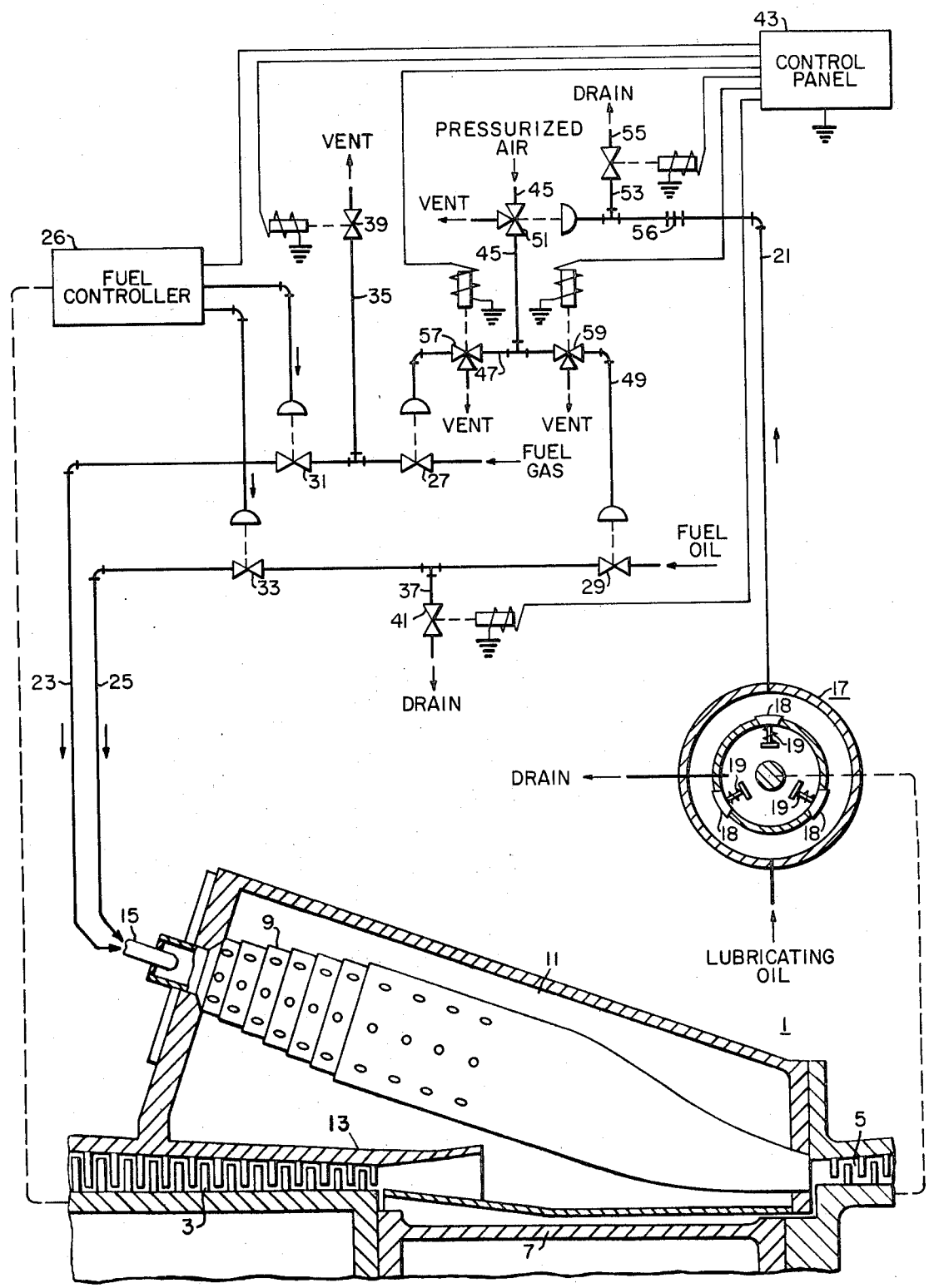

FUEL CONTROL SYSTEM FOR A MULTI-FUEL GAS TURBINE

BACKGROUND OF THE INVENTION

This invention relates to multi-fuel gas turbines and more particularly to a system for controlling the flow of a plurality of fuels utilized to operate the turbine.

Gas turbines which burn more than one fuel normally have redundant control systems for each fuel. The fuel control valving includes a trip valve operable in response to overspeed of the turbine, a control valve, which regulates the rate at which fuel is supplied to the turbine, and an isolation valve operable from a control panel to select the fuel to be burned.

SUMMARY OF THE INVENTION

In general, a system for controlling the flow of a plurality of fuels to a gas turbine, when made in accordance with this invention, comprises a separate conduit for each fuel being supplied to the turbine, a valve disposed in each fuel conduit for shutting off the flow of fuel therethrough, a device for operating each of the shut off valves individually and a device for operating all of the shut off valves simultaneously. The device for operating the valves individually being cooperatively associated with the device for operating the valves simultaneously in such a manner that the latter overrides the former, shutting off all the fuel to the turbine, irrespective of the fuel utilized, the latter device being responsive to the speed of the turbine to operate when the speed exceeds a predetermined value.

BRIEF DESCRIPTION OF THE DRAWING

The objects and advantages of this invention will become more apparent from reading the following detailed description in connection with the accompanying drawing, in which, the sole FIGURE is a fuel flow diagram for a fuel system, made in accordance with this invention, superimposed on a partial sectional view of a gas turbine.

DESCRIPTION OF THE PREFERRED EMBODIMENT

Referring now to the drawing in detail, there is shown a partial sectional view of a gas turbine 1 having a compressor portion 3 and a turbine portion 5 connected to a common shaft or rotor 7. An annular array of combustion chambers or combustors 9 (only one is shown) are disposed circumferentially around the compressor portion 3 and rotor 7. A plenum chamber 11 encircles the combustion chambers 9 and is in fluid communication with a diffuser 13 through which the compressor 3 discharges. Liquid or gaseous fuel is supplied to a fuel nozzle 15 disposed on one end of the combustion chambers 9, the end on the left as shown in the drawing. In the combustion chambers 9 fuel mixes with compressed air from the plenum chamber and burns to produce hot motive fluid which flows through the turbine portion 5, wherein the heat energy in the motive fluid is converted to rotating mechanical energy.

A portion of the rotating mechanical energy is utilized to operate an overspeed oil trip pump diagrammatically indicated at 17. The overspeed oil trip is shown to have a plurality of centrifugal plugs 18 which open against the bias of springs 19 when the speed of the turbine exceeds a predetermined value to allow pressurized fluid, such as lubricating oil, to flow from the system to a drain reducing the pressure in a conduit 21 connected to the discharge thereof.

The fuel control system is diagrammatically shown to comprise the fuel nozzle 15, which receives gaseous fuel through a conduit 23 and liquid fuel or fuel oil through a conduit 25. ON-OFF pneumatic valves 27 and 29 are disposed in the conduits 23 and 25, respectively, and provide means for shutting off the flow of fuel through the conduits 23 and 25, and control valves 31 and 33 are disposed in conduits 23 and 25, respectively, and provide means for controlling the quantity or rate of fuel flowing through the conduits. The control valves 31 and 33 are operated by a controller 26 in response to the speed of the turbine to regulate the flow of fuel to the turbine and its speed.

Conduits 23 and 25 are vented and drained by the conduits 35 and 37, respectively, which are connected thereto downstream of the ON-OFF valves 27 and 29 upstream of the control valves 31 and 33, respectively.

Each conduit 35 and 37 has disposed therein a solenoid valve 39 and 41, respectively, adapted to vent or drain the associated fuel conduit to prevent fuel from entering the combustion chamber 9 of the turbine when it is shut down and to prevent hot gases from backing up the fuel line during operation of the turbine.

The solenoid valves 39 and 41 are normally operated from a control panel 43 containing a plurality of switches, relays and indicators, which are well known in the art, and may be interlocked with the operation of the ON-OFF valve 27 and 29 to open, when the ON-OFF valves are closed.

As shown in the flow diagram the pneumatic ON-OFF valves 27 and 29 are supplied with pneumatic fluid or pressurized air via a supply conduit 45 and branch conduits 47 and 49, respectively. The supply conduit 45 has a hydraulically operated valve 51 disposed therein to shut off the pneumatic fluid to the branch conduits 47 and 49 and to vent them to the atmosphere at the same time. Pressurized hydraulic fluid to operate the valve 51 is supplied by the pump 17 via conduit 21 and upon the turbine reaching a predetermined overspeed, the pressure of the hydraulic fluid is dumped to a drain causing the valve 51 to close, shutting off the supply of pneumatic fluid to the branch conduits 47 and 49 and venting them.

A drain conduit 53 is disposed in fluid communication with the conduit 21 and has a solenoid valve 55 disposed therein. The solenoid valve 55 opens the drain conduit 53 to reduce the hydraulic pressure in conduit 21 to shut off the hydraulically operated valve 51. An orifice or restriction 56 is disposed in the line 21 upstream of the conduit 53 to assist the solenoid valve 55 in closing the hydraulically operated valve 51 rapidly. The solenoid valve 55 is operated from the control panel to provide a manually initiated trip for the fuel control system.

The branch conduits 47 and 49 each have a solenoid valve 57 and 59, respectively, disposed therein. The solenoid valves 57 and 59 are adapted to be operated from a signal manually initiated from the control panel 43 to shut off the pneumatic fluid flowing through the branch conduits 47 and 49 and to vent the downstream portions thereof and thus close the ON-OFF valves 27 and 29, respectively.

The operation of the system is as follows; the turbine unit 1 is brought up to ignition speed, about 25 percent of operating speed, by an auxiliary engine or motor (not shown). The pump 17 develops sufficient pressure so that if the solenoid valve 53 is closed the hydraulically operated valve 51 switches from venting the branch conduits 47 and 49 to supplying them with pressurized pneumatic fluid. Depending upon the position of a fuel selector switch, located on the control panel 43, either the gaseous or the liquid fuel is selected and the associated solenoid valve 57 or 59 is energized closing the associated vent and supplying pressurized pneumatic fluid to the associated ON-OFF valves 27 or 29. The associated vent 35 or drain 37 is also closed by energizing the appropriate solenoid valve 47 or 49, so that the selected fuel can flow through the conduit 23 or 25, through the fuel nozzle 15, and into the combustion chamber 9, wherein it is ignited and burned. The quantity of fuel supplied is regulated by the control valves 31 and 33 as the turbine comes up to speed and accepts load. If, while operating, the turbine overspeeds due to a sudden loss of load the centrifugal plugs 18 in the fuel oil trip pump 17 drain oil from the conduit 21 causing the hydraulically operated valve 51 to shut off the supply of pneumatic fluid to the branch conduits 47 and 49 and vent them to the atmosphere causing any open ON-OFF valve 27 or 29 to close, shutting off all the fuel to the turbine.

The control system, hereinbefore described, advantageous integrates the control of liquid and gaseous fuels into a compact system, which is economical to manufacture, and redundant functions of separate fuel systems are combined, reducing the number of components in the system, without sacrificing modes of operation or reliability of the system.

What is claimed is:

1. A system for controlling the flow of a plurality of fuels to a gas turbine, said system comprising:

a separate fuel conduit for each fuel being supplied to the turbine, a valve means disposed in each fuel conduit for shutting off the flow of fuel therethrough, separate means for operating each shutoff valve means individually, single means for operating all of said shutoff valve means simultaneously, said single means being cooperatively associated with said separate operating means in such a manner as to override said separate operating means, wherein said single operating means shuts off all fuel irrespective of the fuel being utilized, said single operating means being responsive to an overspeed trip member of the turbine, said single operating means also being responsive to a manually initiated trip to shut off all fuel to the turbine, and a valve means in each conduit comprising means for controlling the rate at which fuel flows in each conduit.

2. A system as set forth in claim 1, wherein the valve means for controlling the rate of fuel flow is disposed downstream of the shutoff valve means and each fuel conduit further comprises means for bleeding the conduit, said bleeding means being disposed between the shutoff valve means and the fuel flow rate control valve means.

3. A system as set forth in claim 1, wherein the shutoff valve means is operated by a pneumatic fluid, and the single operating means is operated by a hydraulic fluid.

* * * * *